「「「」

US010648138B2

(12) United States Patent
 Liu

(10) Patent No.: US 10,648,138 B2
(45) Date of Patent: May 12, 2020

(54) MATERIAL SPREADER CONTROLLER

(71) Applicant: Qingdao Huatian Hand Truck, Co., Ltd, Qingdao (CN)

(72) Inventor: Michael Liu, Qingdao (CN)

(73) Assignee: Qingdao Huatian Hand Truck, Co., Ltd, Qingdao (CN)

( * ) Notice: Subject to any disclaimer, the term of this patent is extended or adjusted under 35 U.S.C. 154(b) by 0 days.

(21) Appl. No.: 16/176,476

(22) Filed: Oct. 31, 2018

(65) Prior Publication Data
 US 2019/0127928 A1   May 2, 2019

Related U.S. Application Data

(60) Provisional application No. 62/579,523, filed on Oct. 31, 2017.

(51) Int. Cl.
 *E01C 19/20* (2006.01)
 *E01C 19/48* (2006.01)
 *F16H 61/36* (2006.01)

(52) U.S. Cl.
 CPC .......... *E01C 19/202* (2013.01); *E01C 19/203* (2013.01); *E01C 19/4873* (2013.01); *F16H 61/36* (2013.01); *E01C 2019/206* (2013.01)

(58) Field of Classification Search
 CPC .. E01C 19/202; E01C 19/4873; E01C 19/203; E01C 2019/206; F16H 61/36
 USPC .................. 222/623–625; 239/650, 665, 666, 239/676–678, 686
 See application file for complete search history.

(56) References Cited

U.S. PATENT DOCUMENTS

| | | | | |
|---|---|---|---|---|
| 2,626,083 A | * | 1/1953 | Masters | A01C 15/16 222/48 |
| 2,840,271 A | * | 6/1958 | Liljenberg | A01C 7/02 222/41 |
| 3,187,952 A | * | 6/1965 | Santarelli | A01C 7/16 222/129 |
| 3,224,636 A | * | 12/1965 | Atkinson | A01C 15/02 222/41 |
| 4,121,733 A | * | 10/1978 | McRoskey | A01C 15/02 222/45 |
| 4,588,133 A | * | 5/1986 | Brabb | A01C 7/16 222/561 |
| 8,056,838 B2 | * | 11/2011 | Conner | A01C 17/006 222/625 |

(Continued)

*Primary Examiner* — Lien M Ngo
(74) *Attorney, Agent, or Firm* — Hani Z. Sayed; Rutan & Tucker, LLP

(57) ABSTRACT

An apparatus and a method are provided for a material spreader controller to meter particulate material flowing out of a discharge outlet of a hopper. The material spreader controller is comprised of a housing that receives a control cable from the discharge outlet. A control lever operatively coupled with the control cable may be pulled by a practitioner to adjust the discharge outlet from a completely closed position to an adjusted open position. A control knob enables the practitioner to selectively limit operation of the control lever. Upon turning the control knob, the practitioner may select a degree to which pulling the control lever opens the discharge outlet, thereby limiting the adjusted open position of the discharge outlet. The control knob may be indexed to indicate the position of the control knob relative to a selection indicator on the housing.

5 Claims, 2 Drawing Sheets

(56) References Cited

U.S. PATENT DOCUMENTS

2009/0277979 A1\* 11/2009 Cichy .................. A01C 17/001
                                                             239/683
2013/0105592 A1\* 5/2013 Kendall ................ B05B 7/1404
                                                             239/7

\* cited by examiner

MATERIAL SPREADER CONTROLLER

PRIORITY

The present application claims the benefit of priority of U.S. Provisional Application No. 62/579,523, filed Oct. 31, 2017 and entitled "Material Spreader Controller," which is incorporated in its entirety herein.

FIELD

The field of the present disclosure generally relates to material spreaders. More particularly, the field of the present disclosure relates to an apparatus and a method for a material spreader controller to meter an amount of particulate material flowing out of a discharge outlet of a hopper.

BACKGROUND

Lawn spreaders are used to provide a controlled distribution of materials, such as granular fertilizers, pesticides, seeds and other finely divided granular material onto a lawn surface. Broadcast spreaders generally include a hopper with a variable flow aperture that is controllable to regulate the amount of material allowed to drop from the hopper through the aperture and onto an impeller. The impeller rotates with the movement of the spreader and distributes the granular material outwardly from the impeller. A deflector may be coupled with the hopper and configured to control the direction of the broadcast output flow of the granular material.

Control mechanisms may be provided on a broadcast spreader to enable adjustment of the flow aperture. The control mechanism typically enables adjusting the length of a control cable that is in mechanical communication with the flow aperture. Some control mechanisms are configured to allow for disassembly and thus are serviceable. Often times, however, serviceable control mechanisms must be disassembled at one or more points and may also require a practitioner to route the control cable along a specific path through the mechanism, so that the length adjustment mechanism will continue to work properly. Some control mechanisms may not allow for disassembly and thus are not maintainable. Further, some broadcast spreaders may include an adjustable deflector that is controlled by way of a cable that is similarly difficult to maintain.

Therefore, a need exists for an improved spreader control mechanism that provides ease of use, assembly, and maintenance.

SUMMARY

An apparatus and a method are provided for a material spreader controller to meter an amount of particulate material flowing out of a discharge outlet of a hopper. The material spreader controller is comprised of a housing configured to receive a control cable extending from the discharge outlet. A control lever is operatively coupled with the control cable whereby a practitioner may operate the discharge outlet. The control lever may be pulled by the practitioner to adjust the discharge outlet from a completely closed position to an adjusted open position. A control knob is configured to enable the practitioner to selectively limit operation of the discharge outlet. The control knob may be configured such that turning the control knob limits a degree to which pulling the control lever opens the discharge outlet, thereby limiting the adjusted open position of the discharge outlet. The control knob may be indexed so as to indicate the position of the control knob relative to a selection indicator disposed on a front face of the housing.

In an exemplary embodiment, a material spreader controller for metering an amount of particulate material flowing out of a discharge outlet of a hopper comprises a housing configured to receive a control cable extending from the discharge outlet; a control lever operatively coupled with the control cable to operate the discharge outlet; and a control knob configured to limit operation of the discharge outlet.

In another exemplary embodiment, the housing comprises a generally rigid envelope configured to support the control lever, the control knob, and any other components whereby the control lever and the control knob may be placed into mechanical communication with the discharge outlet. In another exemplary embodiment, the housing includes a mounting hole that extends laterally through the housing and is configured to receive a portion of a handle of a material spreader. In another exemplary embodiment, the mounting hole facilitates fastening the housing onto the handle, such that the control lever and control knob are within operative reach of a practitioner operating the material spreader.

In another exemplary embodiment, the control lever is pivotally mounted within the housing, such that the control lever may be angled with respect to the housing, the control lever being biased in a forward position with respect to the housing by way of a spring. In another exemplary embodiment, the control lever is coupled with the control cable, such that pulling the control lever adjusts the discharge outlet from a completely closed position to an adjusted open position. In another exemplary embodiment, the control cable is routed around a post of the control lever and through the housing to a slider, the control cable being fixated to the slider, such that a practitioner pulling the control lever moves the slider into forcible contact with a limiter. In another exemplary embodiment, the limiter is an axially mounted spiral-shaped disc configured to restrict a distance over which the slider may move within the housing, the slider being biased into contact with the limiter by way of a spring. In another exemplary embodiment, contact between the slider and the limiter regulates a length of the control cable that is available for opening the discharge outlet when the control lever is pulled. In another exemplary embodiment, a shaped hole is disposed in the center of the limiter and configured to fixedly receive the control knob, the shaped hole and the control knob enabling a practitioner to select an adjusted open position of the discharge outlet based on a selection indicator disposed on the housing and indices on the control knob.

In another exemplary embodiment, the control knob is rotatably mounted on a front face of the housing, such that the control knob may be turned with respect to the front face of the housing. In another exemplary embodiment, the control knob may be coupled with the control lever, such that turning the control knob limits the degree to which pulling the control lever opens the discharge outlet, thereby limiting an adjusted open position of the discharge outlet. In another exemplary embodiment, the control knob is indexed so as to indicate a position of the control knob relative to a selection indicator disposed on the front face. In another exemplary embodiment, the relationship between the selection indicator and indices on the control knob may be used to indicate a degree to which an adjusted open position of the discharge outlet is limited. In another exemplary embodiment, turning the control knob from an initial, unturned position to a fully turned position with respect to the selection indicator correspondingly changes the adjusted open position of the discharge outlet from a minimally open position to a completely open position.

In an exemplary embodiment, a method for a material spreader controller to meter an amount of particulate material flowing out of a discharge outlet of a hopper comprises configuring a housing to receive a control cable extending from the discharge outlet; coupling a control lever with the control cable to enable operation of the discharge outlet; and configuring a control knob to selectively limit operation of the control lever.

In another exemplary embodiment, coupling the control lever further comprises routing the control cable around a post of the control lever and through the housing to a slider, such that a practitioner pulling the control lever opens the discharge outlet. In another exemplary embodiment, routing the control cable further comprises fixating the control cable to the slider, such that the practitioner pulling the control lever moves the slider into forcible contact with a limiter coupled with the control knob, thereby limiting opening of the discharge outlet. In another exemplary embodiment, configuring the control knob further comprises coupling the control knob with a limiter configured to restrict a length of the control cable that is available for opening of the discharge outlet when the control lever is pulled. In another exemplary embodiment, coupling the control knob with the limiter further comprises forming an axially mounted spiral-shaped disc to restrict a distance over which a slider may be moved by a practitioner pulling the control lever, the slider being fixated to the control cable and coupled with the limiter whereby the practitioner may turn the control knob to select a degree to which the discharge outlet may be opened. In another exemplary embodiment, configuring the control knob further comprises disposing indices on the control knob and disposing a selection indicator adjacent to the control knob to enable a practitioner to select a degree to which the discharge outlet may be opened.

BRIEF DESCRIPTION OF THE DRAWINGS

The drawings refer to embodiments of the present disclosure in which.

Figure 1:
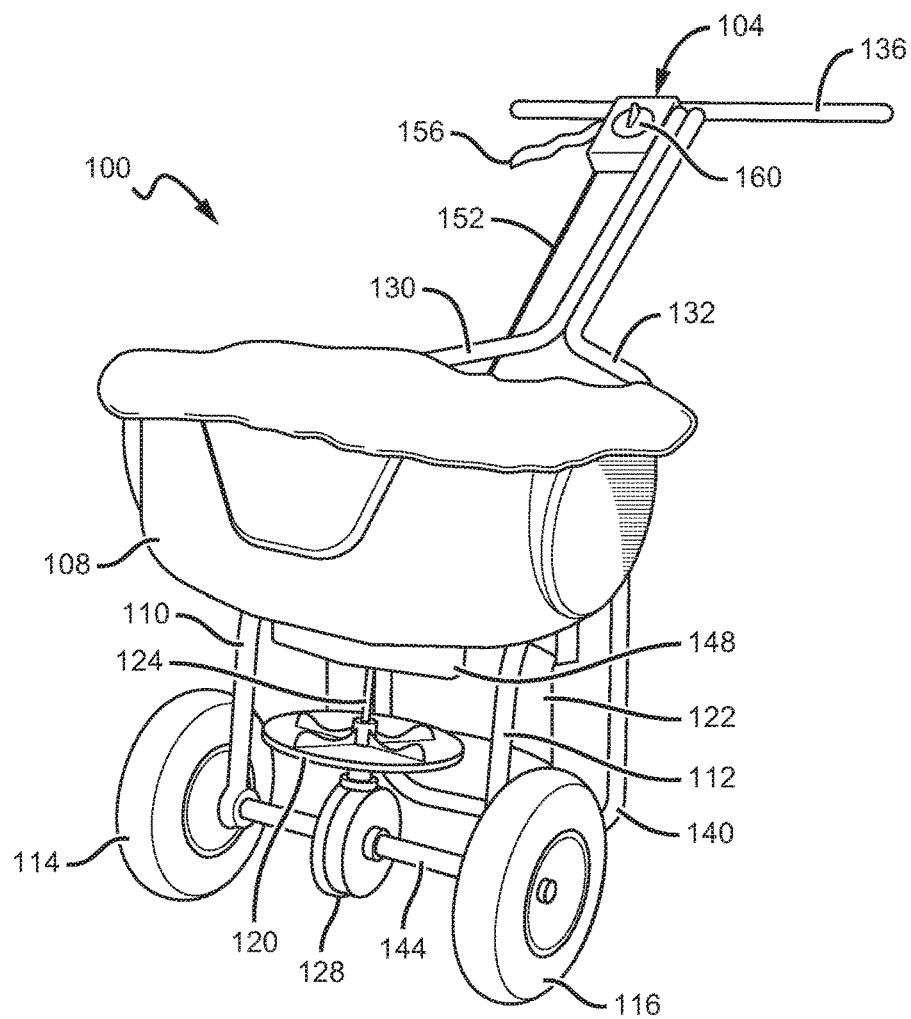
FIG. 1 illustrates a perspective view of a material spreader that includes an exemplary embodiment of a material spreader controller, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first lever," may be made. However, the specific numeric reference should not be interpreted as a literal sequential order but rather interpreted that the "first lever" is different than a "second lever." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a material spreader controller configured to meter an amount of particulate material flowing out of a discharge outlet of a hopper. The material spreader controller is comprised of a rigid housing configured to receive a control cable extending from the discharge outlet. A control lever is operatively coupled with the control cable whereby a practitioner may operate the discharge outlet to allow the particulate material to flow from the hopper. The control lever may be pulled by the practitioner to adjust the discharge outlet from a completely closed position to an adjusted open position. A control knob is configured to enable the practitioner to selectively limit the amount of particulate material flowing out of the discharge outlet. The control knob may be configured such that turning the control knob limits a degree to which pulling the control lever opens the discharge outlet, thereby limiting the adjusted open position of the discharge outlet. The control knob may be indexed so as to indicate the position of the control knob relative to a selection indicator disposed on a front face of the housing.

FIG. 1 illustrates a perspective view of a material spreader 100 that includes an exemplary embodiment of a material spreader controller 104, according to the present disclosure. The material spreader 100 is comprised of a hopper 108 for particulate material supported by a frame comprising tubular side members 110, 112 connected by a cross brace (not shown), the tubular members being mounted on a pair of ground engaging wheels 114, 116. An impeller 120 is horizontally disposed and fixedly mounted on a shaft 124 that is rotatably driven at its lower end by a geared drive connection 128. Tubular members 130, 132 are respectively bolted to tubular side members 110, 112. The upper portions of the tubular members 130, 132 cooperate to serve as a handle 136. The lower portion of the tubular members 130, 132 serves as a support 140 of the material spreader 100 when it is not being advanced. An axle 144 is journaled within the tubular side members 110, 112. One or both of the wheels 114, 116 are fixedly connected to the axle 144 for transmitting torque to the shaft 124 by means of a set of bevel gears within the geared drive connection 128, which rotates the impeller 120 as the material spreader 100 is advanced. An agitator may be mounted on an upper portion of shaft 124 and disposed within the hopper 108, such that the agitator rotates with the impeller 120. A shield 122 prevents particulate material from being thrown towards a practitioner operating the material spreader 100.

Particulate material may be discharged from the hopper 108 by way of a discharge outlet 148. The discharge outlet 148 may be comprised of one or more discharge ports in the bottom portion of the hopper 108. The amount of particulate material flowing through the discharge outlet 148 may be metered by adjustment of the size of the discharge ports. Adjusting the size of the discharge ports may be accomplished by a suitably configured shut-off plate, or other similar mechanism, that is slidably coupled with the hopper 108. A rate control rod or control cable 152 may be coupled at one end with the shut-off plate and extend vertically to the material spreader controller 104. The control cable 152 places a control lever 156 and a control knob 160 in mechanical communication with the shut-off plate, whereby the discharge outlet 148 may be adjusted from a completely closed position to a completely open position so as to allow the particulate material to flow through the discharge ports and drop onto the impeller 120.

Figure 2:
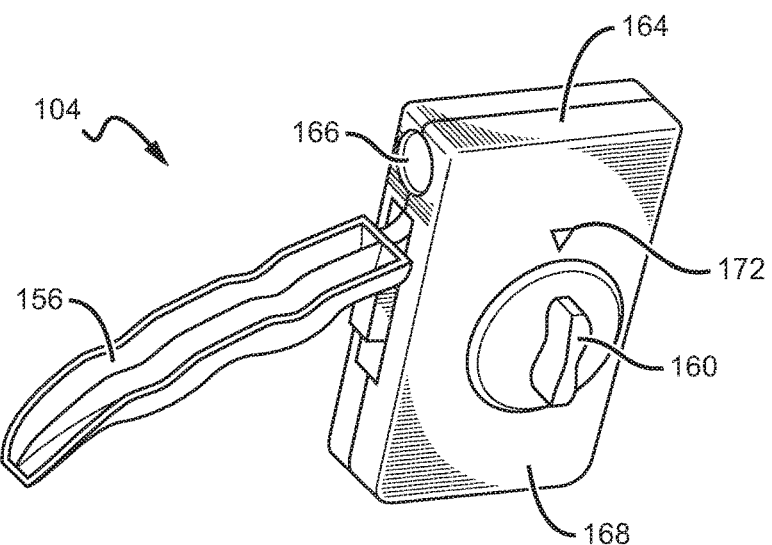
FIG. 2 illustrates an isometric view of an exemplary embodiment of a material spreader controller that may be incorporated into the material spreader of FIG. 1, in accordance with the present disclosure.

FIG. 2 illustrates an isometric view of an exemplary embodiment of a material spreader controller 104 that may be incorporated into the material spreader shown in FIG. 1, in accordance with the present disclosure. The material spreader controller 104 generally is comprised of a control lever 156, a control knob 160, and a housing 164. The housing 164 is a generally rigid envelope configured to support the control lever 156, the control knob 160, and any other components whereby the control lever 156 and the control knob 160 may be placed into mechanical communication with the discharge outlet 148, as described above. In the illustrated embodiment of FIG. 2, the housing 164 comprises a mounting hole 166 that extends laterally through the housing and is configured to receive a portion of the handle 136. The mounting hole 166 facilitates fastening the housing 164 onto the handle 136, such that the control lever 156 and control knob 160 are within operative reach of a practitioner operating the material spreader 100 in accordance with the present disclosure. It is contemplated that the housing 164 may be comprised of any suitably rigid, durable material, such as any of various plastics, metals, and the like.

The control lever 156 is pivotally mounted within the housing 164, such that the control lever 156 may be angled with respect to the housing. The control lever 156 may be coupled with the control cable 152, such that pulling the control lever 156 toward the handle 136 adjusts the discharge outlet 148 from the completely closed position to an adjusted open position. In the embodiment illustrated in FIG. 2, the control knob 160 is rotatably mounted on a front face 168 of the housing 164, such that the control knob 160 may be turned with respect to the front face 168. The control knob 160 may be coupled with the control lever 156, such that turning the control knob 160 limits the degree to which pulling the control lever 156 toward the handle 136 opens the discharge outlet 148, thereby limiting the adjusted open position of the discharge outlet 148. The control knob 160 may be indexed so as to indicate the position of the control knob relative to a selection indicator 172 disposed on the front face 168. The relationship between the selection indicator 172 and indices on the control knob 160 may be used to indicate the degree to which the adjusted open position of the discharge outlet 148 is limited. It is contemplated that, in some embodiments, turning the control knob 160 from an initial, unturned position to a fully turned position with respect to the selection indicator 172 correspondingly allows the control lever 156 to change the adjusted open position of the discharge outlet 148 from a minimally open position to a completely open position.

Figure 3:
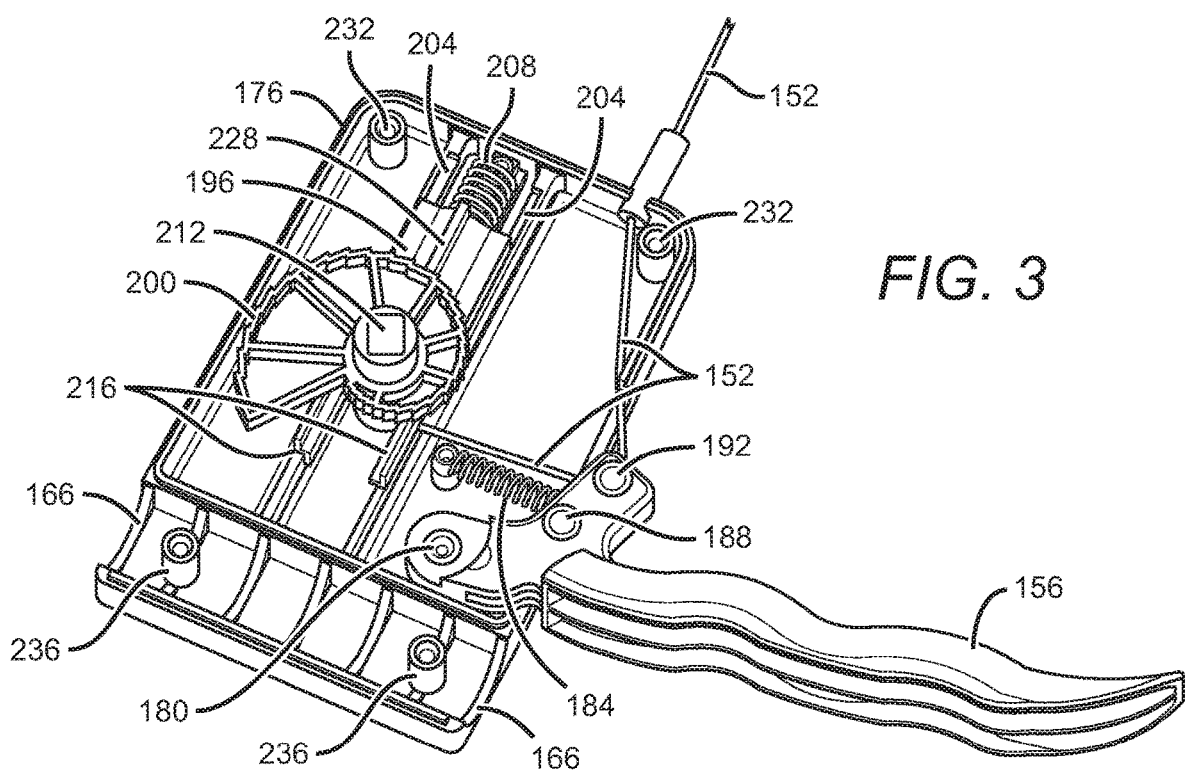
FIG. 3 illustrates an isometric view of an exemplary embodiment of a rear housing portion coupled with several components that may comprise the material spreader controller shown in FIGS. 1-2.
Figure 4:
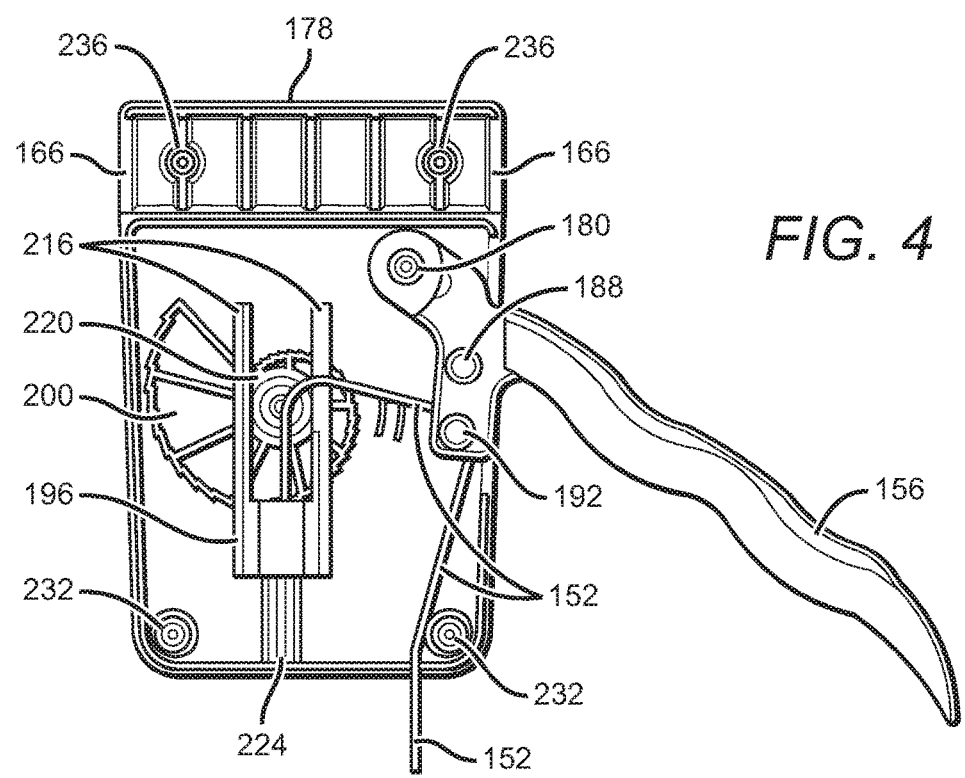
FIG. 4 illustrates a plan view of an exemplary embodiment of a front housing that may be coupled with the rear housing portion of FIG. 3 to form a housing comprising the material spreader controller of FIG. 2.

FIG. 3 illustrates an isometric view of an exemplary embodiment of a rear housing portion 176 coupled with several components that may comprise the material spreader controller 104 shown in FIGS. 1-2. FIG. 4 illustrates a plan view of an exemplary embodiment of a front housing portion 178 that may be coupled with the rear housing portion 176 to form the housing 164. As shown in FIG. 3, the control lever 156 is rotatable upon a pivot 180 disposed within the rear housing portion 176. A spring 184 attached to a post 188 comprising the control lever 156 serves to bias the control lever 156 in a forward position with respect to the housing 164, as best shown in FIG. 1. As will be recognized, the control lever 156 is shown in FIG. 3 disposed in a rearward, pulled position, whereby the discharge outlet 148 may be placed in the adjusted open position discussed with respect to FIG. 2. In FIG. 4, however, the control lever 156 is shown in an initial, forwardly-biased position with respect to the front housing portion 178.

In the embodiment of FIGS. 3-4, the control cable 152 is routed around a post 192 of the control lever 156 and through the rear housing portion 176 to a slider 196. The control cable 152 is fixated to the slider 196, such that a practitioner pulling the control lever 156 moves the slider 196 into forcible contact with a limiter 200. The limiter 200 generally is an axially mounted spiral-shaped disc configured to restrict a distance over which the slider 196 may move within channels 204 of the rear housing portion 176. Contact between the slider 196 and the limiter 200 regulates a length of the control cable 152 that is available for opening the discharge outlet 148 when the control lever 156 is pulled. A spring 208 is disposed between the slider 196 and an interior of the rear housing portion 176 so as to bias the slider 196 into contact with the limiter 200 in absence of the control lever 156 being pulled. A shaped hole 212 is disposed in the center of the limiter 200 and configured to fixedly receive the control knob 160. The shaped hole 212 and the control knob 160 enable the practitioner to select an adjusted open position of the discharge outlet 148, based on the selection indicator 172 and the indices on the control knob 160, as discussed hereinabove.

FIG. 4 shows the control lever 156, the slider 196, and the limiter 200 coupled with the front housing portion 178. The slider 196 includes parallel legs 216 that straddle an axle portion 220 of the limiter 200. The parallel legs 216 serve to maintain an advantageous alignment between the slider 196 and the limiter 200 during turning of the limiter 200 about the axle portion 220. Further, a channel 224 disposed in the front housing portion 178 slidably receives a longitudinal protrusion 228 disposed on the side of the slider 196, as shown in FIG. 3. The channel 224 and the longitudinal protrusion 228 are configured to maintain the orientation of the slider 196 relative to the limiter 200 during movement of the slider 196 along the channels 204 discussed hereinabove. The longitudinal protrusion 228 is configured to further operate as a contact between the slider 196 and the limiter 200, as shown in FIG. 3.

As shown in FIGS. 3-4, the front and rear housing portions 178, 176 include multiple standoffs that are configured to facilitate fastening the front and rear housing portions together so as to form the housing 164. Specifically, standoffs 232 disposed in the rear housing portion 176 are configured to couple with standoffs 232 in the front housing portion 178. Similarly, standoffs 236 disposed in each of the front and rear housing portions 178, 176 are configured to be coupled together. As will be appreciated, a hole may extend through at least one of each pair of the standoffs 232, 236 and be configured to receive hardware fasteners, such as screws, that are suitable for fastening the front and rear housing portions 178, 176. Further, the standoffs 236 may be disposed within the mounting hole 166 and configured to extend through suitable holes in the portion of the handle 136 that receives the housing 164. As will be appreciated, therefore, the standoffs 236 may be configured to couple the material spreader controller 104 with the handle 136 and maintain an orientation of the material spreader controller 104 that is advantageous for operating the discharge outlet 148 during advancing of the material spreader 100.

Methods for a material spreader controller 104 to meter an amount of particulate material flowing out of a discharge outlet 148 of a hopper 108 include, in some embodiments, configuring a housing 164 to receive a control cable 152 extending from the discharge outlet 148. The housing 164 may comprise a generally rigid envelope including, in some embodiments, a front housing portion 178 and a rear housing portion 176 that may be fastened together by way of suitable hardware fasteners.

The methods may further include, in some embodiments, coupling a control lever 156 with the control cable 152 to enable operation of the discharge outlet 148. In some embodiments, coupling the control lever 156 may further comprise routing the control cable 152 around a post 192 of the control lever 156 and through the housing 164 to a slider 196, such that a practitioner pulling the control lever 156 opens the discharge outlet 148. Further, in some embodiments, routing the control cable 152 further comprises fixating the control cable 152 to the slider 196, such that the practitioner pulling the control lever 156 moves the slider 196 into forcible contact with a limiter 200 coupled with a control knob 160, thereby limiting opening of the discharge outlet 148.

The methods may further include, in some embodiments, configuring a control knob 160 to selectively limit operation of the control lever 156. Configuring the control knob 160 may further include, in some embodiments, coupling the control knob 160 with a limiter 200 configured to restrict a length of the control cable 152 that is available for opening of the discharge outlet 148 when the control lever 156 is pulled. In some embodiments, coupling the control knob 160 with the limiter 200 may further comprise forming an axially mounted spiral-shaped disc to restrict a distance over which the slider 196 may be moved by a practitioner pulling the control lever 156. The slider 196 may be fixated to the control cable 152 and coupled with the limiter 200 whereby the practitioner may turn the control knob 160 to select a degree to which the discharge outlet 148 may be opened. Further, in some embodiments, configuring the control knob 160 may include disposing indices on the control knob 160 and disposing a selection indicator 172 adjacent to the control knob 160 to enable a practitioner to select a degree to which the discharge outlet 148 may be opened.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A material spreader controller for metering an amount of particulate material flowing out of a discharge outlet of a hopper, the material spreader controller comprising:
    a housing configured to receive a control cable extending from the discharge outlet;
    a control lever operatively coupled with the control cable to operate the discharge outlet wherein:
        the control lever is pivotally mounted within the housing such that the control lever may be angled with respect to the housing,
        the control lever being biased in a forward position with respect to the housing by way of a spring and wherein the control cable is routed around a post of the control lever and through the housing to a slider
        the control cable being fixated to the slider, such that a practitioner pulling the control lever moves the slider into forcible contact with a limiter; and
    a control knob configured to limit operation of the discharge outlet.

2. The spreader controller of claim 1, wherein a shaped hole is disposed in the center of the limiter and configured to fixedly receive the control knob, the shaped hole and the control knob enabling a practitioner to select an adjusted open position of the discharge outlet based on a selection indicator disposed on the housing and indices on the control knob.

3. The spreader controller of claim 1, wherein the limiter is an axially mounted spiral-shaped disc configured to restrict a distance over which the slider may move within the housing, the slider being biased into contact with the limiter by way of a spring.

4. The spreader controller of claim 3, wherein contact between the slider and the limiter regulates a length of the control cable that is available for opening the discharge outlet when the control lever is pulled.

5. A method for a material spreader controller to meter an amount of particulate material flowing out of a discharge outlet of a hopper, the method comprising:
    configuring a housing to receive a control cable extending from the discharge outlet;
    coupling a control lever with the control cable to enable operation of the discharge outlet; and
    configuring a control knob to selectively limit operation of the control lever wherein configuring the control knob further comprises coupling the control knob with a limiter configured to restrict a length of the control cable that is available for opening of the discharge outlet when the control lever is pulled and further wherein coupling the control knob with the limiter further comprises forming an axially mounted spiral-shaped disc to restrict a distance over which a slider may be moved by a practitioner pulling the control lever, the slider being fixated to the control cable and coupled with the limiter whereby the practitioner may turn the control knob to select a degree to which the discharge outlet may be opened.

* * * * *